Oct. 13, 1942.　　A. J. MARSHAUS　　2,298,398
POULTRY FEEDER AND FOUNTAIN
Filed Jan. 11, 1940　　3 Sheets-Sheet 1
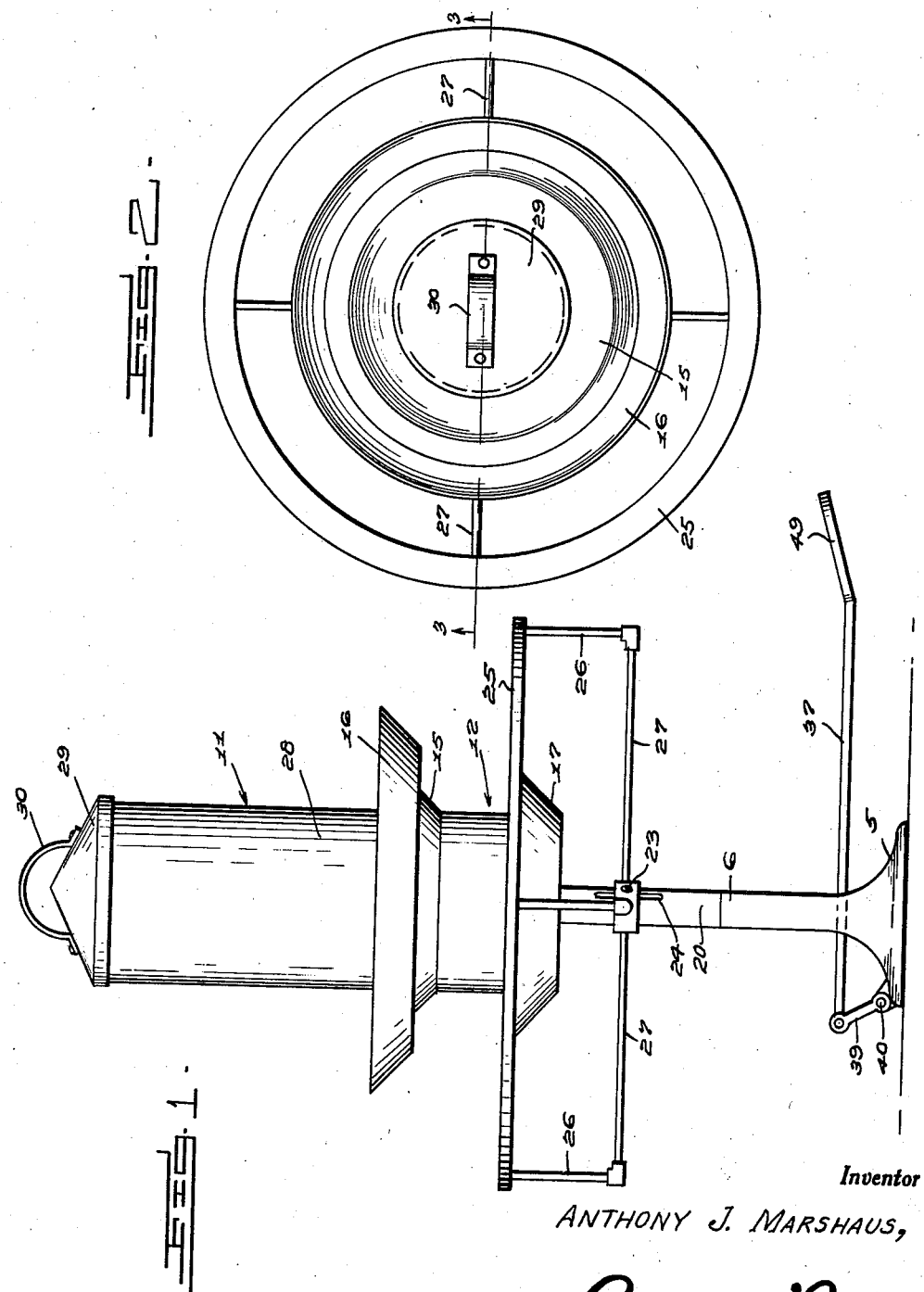
Inventor
ANTHONY J. MARSHAUS,
By Clarence A. O'Brien
and Hyman Berman
Attorneys

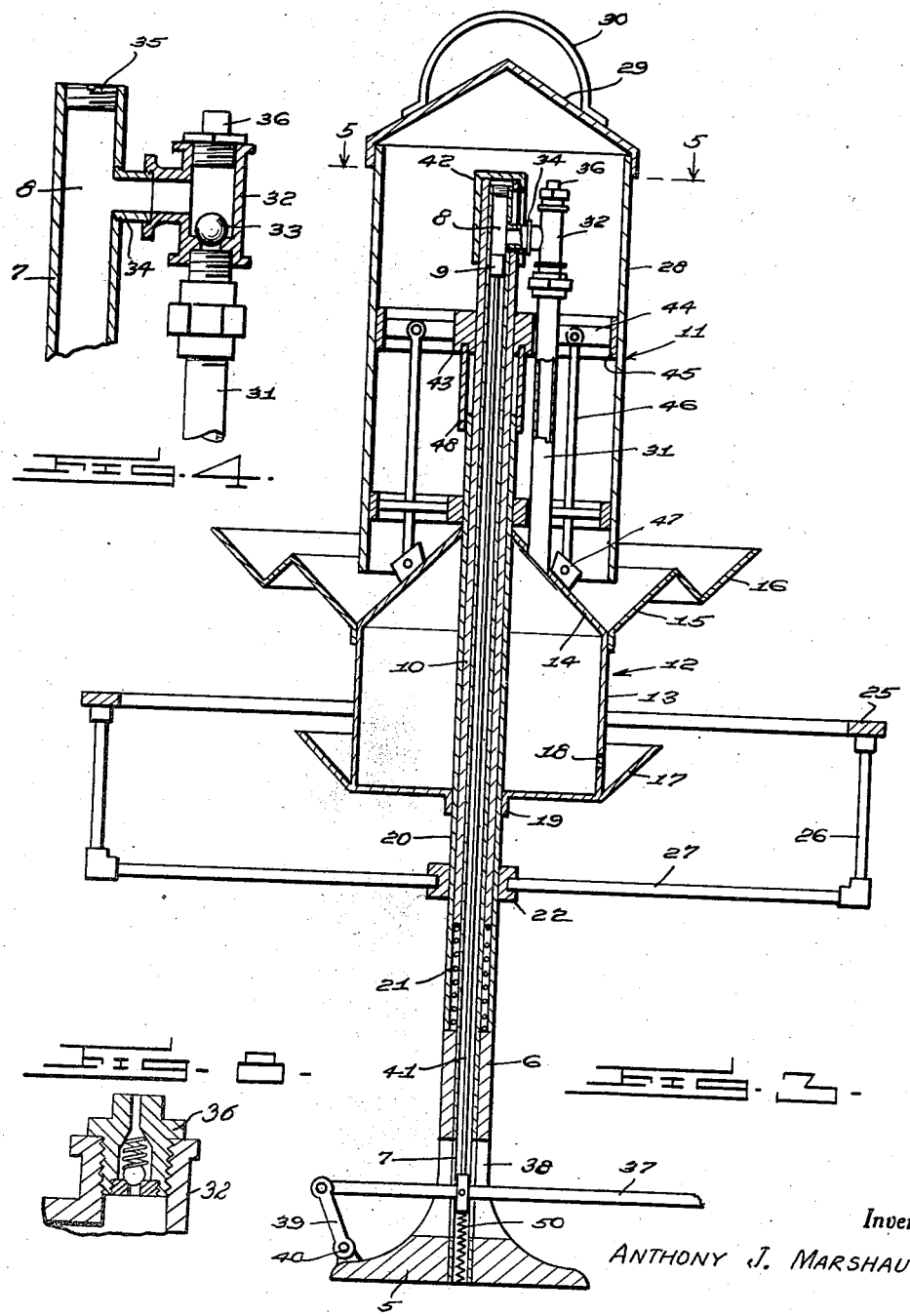

Oct. 13, 1942.　　　　A. J. MARSHAUS　　　　2,298,398
POULTRY FEEDER AND FOUNTAIN
Filed Jan. 11, 1940　　　3 Sheets-Sheet 3
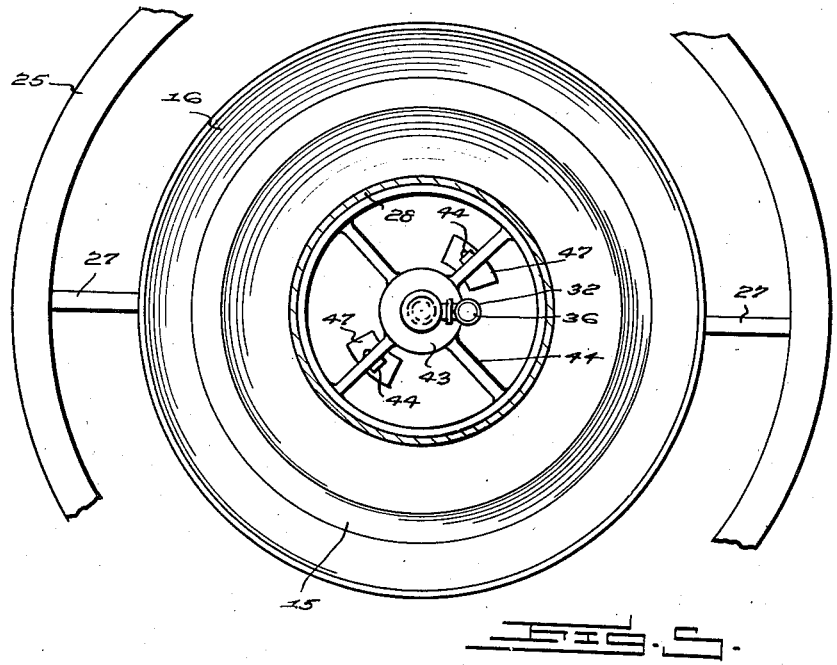
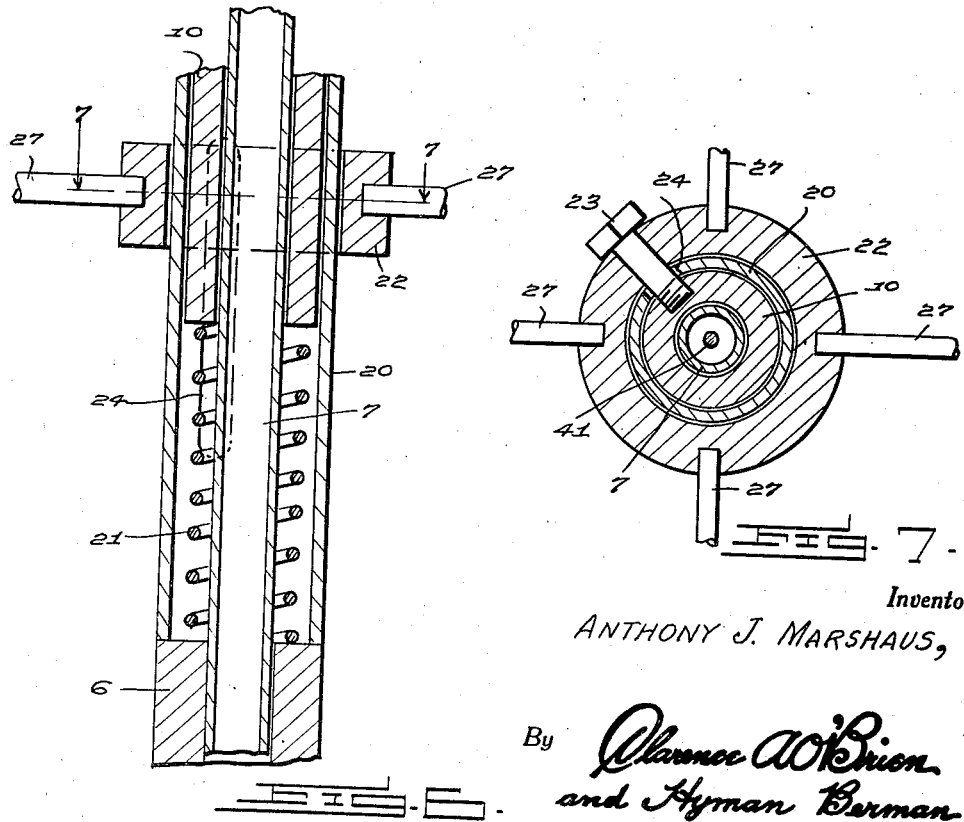
Inventor
ANTHONY J. MARSHAUS,
By Clarence A. O'Brien
and Hyman Berman
Attorneys Patented Oct. 13, 1942

2,298,398

UNITED STATES PATENT OFFICE 2,298,398

POULTRY FEEDER AND FOUNTAIN

Anthony J. Marshaus, Cleveland, Ohio

Application January 11, 1940, Serial No. 313,435

3 Claims. (Cl. 119—51.5)

This invention appertains to new and useful improvements in animal husbandry and more particularly to a poultry feeder and drinking fountain.

The principal object of the present invention is to provide a dry mash feeder and drinking fountain for fowls which are combined in such a manner as to permit the fowl to obtain the mash and water at one location instead of requiring the fowl to pick up mash and then move on to a distant fountain, thus eliminating considerably loss of mash through dropping of the mash onto the ground from the fowl's bill.

Another important object of the invention is to provide a feeder having a trough and a spillover trough associated with the first-mentioned trough so as to catch the overflow of mash from the first-mentioned trough.

Other objects and advantages of the invention will become apparent to the reader of the following specification.

In the drawings:

Figure 1 represents a side elevational view of the outfit.

Figure 2 is a top plan view.

Figure 3 is a vertical sectional view on a line 3—3 of Figure 2.

Figure 4 is a fragmentary sectional view through the check valve means.

Figure 5 is a section on the line 5—5 of Figure 3.

Figure 6 is an enlarged detailed sectional view through the feeder control.

Figure 7 is a section on the line 7—7 of Figure 6.

Figure 8 is a fragmentary detailed sectional view showing the check valve plug in the upper portion of the air exhaust pipe.

Referring to the drawings wherein like numerals designate like parts, it can be seen that numeral 5 represents the base from which rises the hollow standard 6. Extending from the base 5 upwardly through the standard 6 is the tube 7 which defines a suction chamber 8 at its upper end in which the plunger 9 operates. Slidable on the tube 7 is the sleeve 10 which carries the feeder assembly 11 at its upper end. Beneath the feeder 11 is the fountain 12 including a tank 13 having the conical-shaped top 14 also serving as the bottom for the feeder 11. Extending laterally from the upper portion of the tank 13 is the mash trough 15, and radiating from the trough 15 is the overflow trough 16. Numeral 17 denotes the water trough at the lower portion of the tank 13 which receives a supply of water through the small ports 18 in the lower portion of the tank 13. The tank 13 is preferably welded by means of a small collar 19 to the barrel 20, the latter having its lower end resting upon the upper end of the standard 6.

Between the standard 6 and the lower end of the slidable sleeve 10 is the compression spring 21. A collar 22 is slidable on the barrel 20, the barrel 20 being slotted at this point to permit the screw 23 to pass therethrough from the collar 22. This screw 23 is driven into the slidable sleeve 10, the slot being denoted by numeral 24.

Numeral 25 represents the annular fowl perch which is supported by uprights 26 at the outer ends of the arms 27 which radiate from the slide collar 22.

Numeral 28 denotes the shell of the feeder 11 in which the mash can be placed by removing the top 29, the latter being equipped with a handle 30.

An air eduction tube 31 rises from the top 14 and connects to the T-fitting 32 in which the check valve ball 33 is seatable. A coupling 34 is provided between the T-fitting 32 and the upper end of the tube, the tube 7 having a cleanout plug 35 at its upper end. The fitting 32 has a valved plug 36 at its upper end.

A handle bar 37 extends through a slot 28 in the lower portion of the standard 6 and is connected by a link 39 to a lug on the base 5 as at 40. The hand bar 37 has a collar thereon connected to the lower end of a rod 41 which extends vertically in the tube 7 and at the upper end of this rod is the plunger 9.

Obviously, to fill the container 13, water is poured into the trough 17, filling the container 13 to a level above the opening or openings 18. When this level has been reached, the hand bar 37 is operated. The bar is pressed downwardly by hand or foot action, lowering the piston 9 and sucking air from the container 13 by way of the pipe 31 into the upper portion of the tube 7 and chamber 8. Upon the up-stroke of the hand bar 37 which is occasioned by the compression spring 50, the ball valve 33 closes off the pipe 31 while the trapped air is expelled through the valved plug 36. Thus as air is evacuated from the container 13 and water added by maintaining the trough 17 filled, the level will rise in the container 13 until the desired amount prevails in the container.

A cap structure 42 is provided for the upper end of the slide sleeve 10 to prevent mash from getting between the tube 7 and sleeve 10. A collar 43 is provided on the upper portion of the sleeve 10 and has arms 44 radiating therefrom and connected to the annulus 45, which in turn is secured to the inside of the shell 28.

Leg members 46 depend from the arms 44 and carry scrapers 47 at the lower ends thereof for scraping action against the tank top 14 to the end that mash is pushed into the trough 15.

A short apron 48 depends from the collar 43 and interlaps the barrel 20 at the upper end thereof so that mash cannot get in between the sleeve 10 and barrel 20.

If desired a foot-pedal 49 can be provided on the free end of the lever 37 and a compression spring 50 is positioned below the lever 37 so that the lever will be raised each time the foot is removed from the foot pedal 49 after the depression thereof.

When weight, such as the weight of a fowl, is imposed on the roost or perch 25, the collar 22 being connected to the sleeve 10 (see Fig. 7) causes downward movement of the sleeve 10 against the action of the compression spring 21, which spring normally serves to hold the hopper 28 in elevated position above the feed trough 15.

This downward movement of the sleeve 10, of course, carries with it the hopper 28, the lower edge of the hopper seating in the trough 15 so that no more feed can enter the trough while the fowl is eating. When the weight of the fowl is removed from the perch 25, the spring 21 will again elevate the hopper 28 so that there will be a replenishment of feed in the trough 15.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. Poultry watering means comprising a water tank having a trough at the lower portion thereof, said tank having an opening for admitting water to the trough from the tank, an upright for the tank, said upright extending vertically through the tank, a treadle mounted on the lower portion of the upright, said upright being hollow, a rod extending from the treadle and vertically in the hollow upright and provided with a plunger at the upper end thereof, a pipe extending from the tank and communicating with the upper end of the hollow upright, a check valve in the pipe adapted to pass air from the water tank to the interior of the upright when the plunger is moved in a downward direction, and a valved structure in the top of the pipe opening to the atmosphere.

2. In combination, a poultry fountain comprising a tank, a trough at the lower portion of the tank, said tank having an opening therein through which water can pass to the trough, an upright extending through the tank, a feed hopper mounted on the upper portion of the upright and above the tank, a trough mounted above the tank and beneath the hopper, said hopper being slidable on the upper portion of the upright and adapted to move against the last-mentioned trough to cut off the supply of feed to the latter, said tank being stationarily mounted, spring means for sustaining the hopper in elevated position and a perch connected with the hopper adapted to move the hopper to closed position with respect to the feed trough when the weight of a fowl is imposed thereon.

3. In combination, a poultry fountain comprising a tank, a trough at the lower portion of the tank, said tank having an opening therein through which water can pass to the trough, an upright extending through the tank, a feed hopper mounted on the upper portion of the upright and above the tank, a trough mounted above the tank and beneath the hopper, said hopper being slidable on the upper portion of the upright and adapted to move against the last-mentioned trough to cut off the supply of feed to the latter, said tank being stationarily mounted, spring means for sustaining the hopper in elevated position and a perch connected with the hopper adapted to move the hopper to closed position with respect to the feed trough when the weight of a fowl is imposed thereon, and depending swingable scraper members in the hopper adapted to move feed in the lower portion of the hopper toward the adjacent trough when the hopper is moved in a downward direction.

ANTHONY J. MARSHAUS.